Jan. 23, 1968     W. L. BRYAN     3,364,914
HEATING AND LIGHTING APPARATUS
Filed April 15, 1966     3 Sheets-Sheet 1
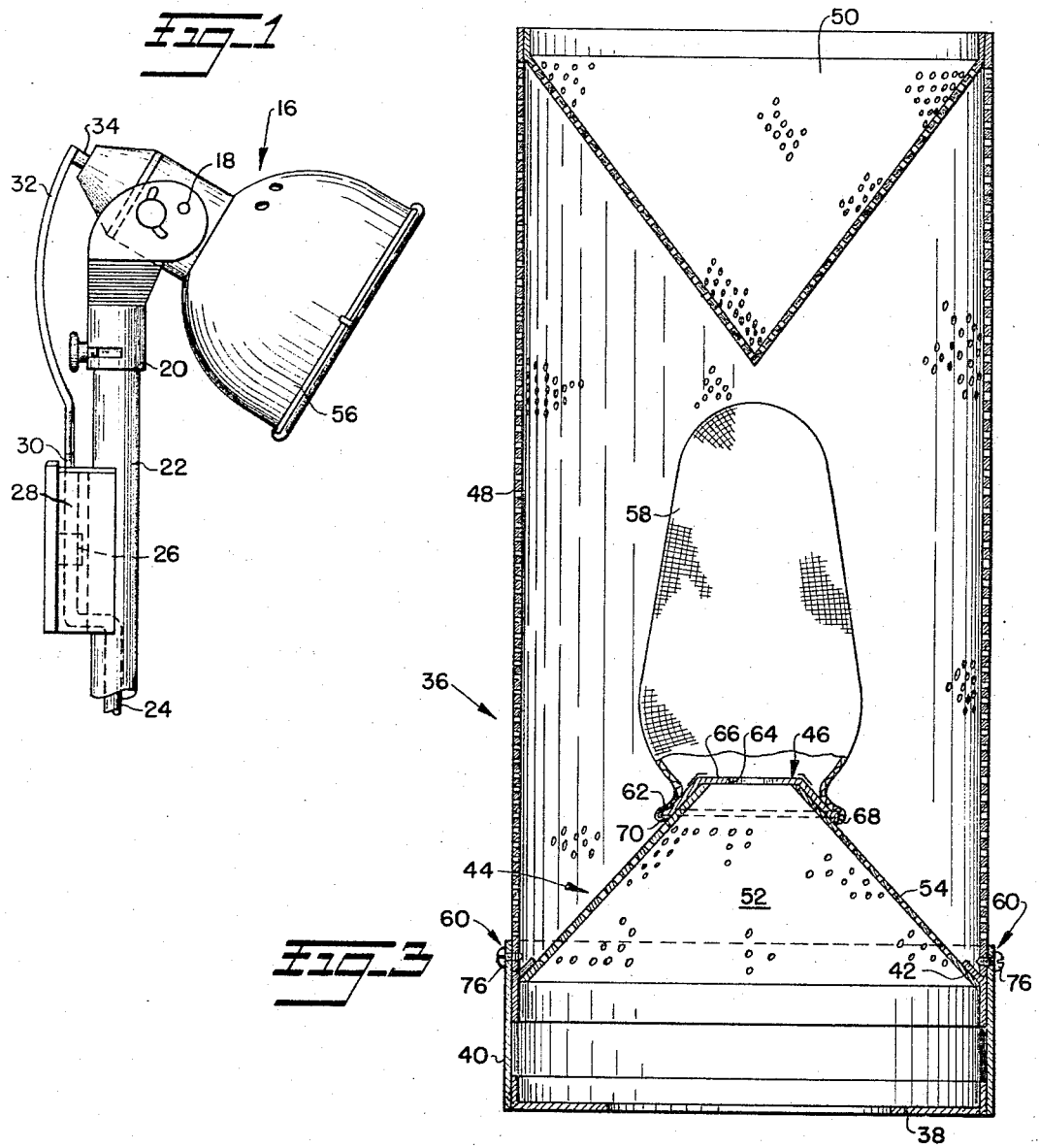
INVENTOR
WILLIAM L. BRYAN
BY     *Strauch, Nolan & Neale*
ATTORNEYS

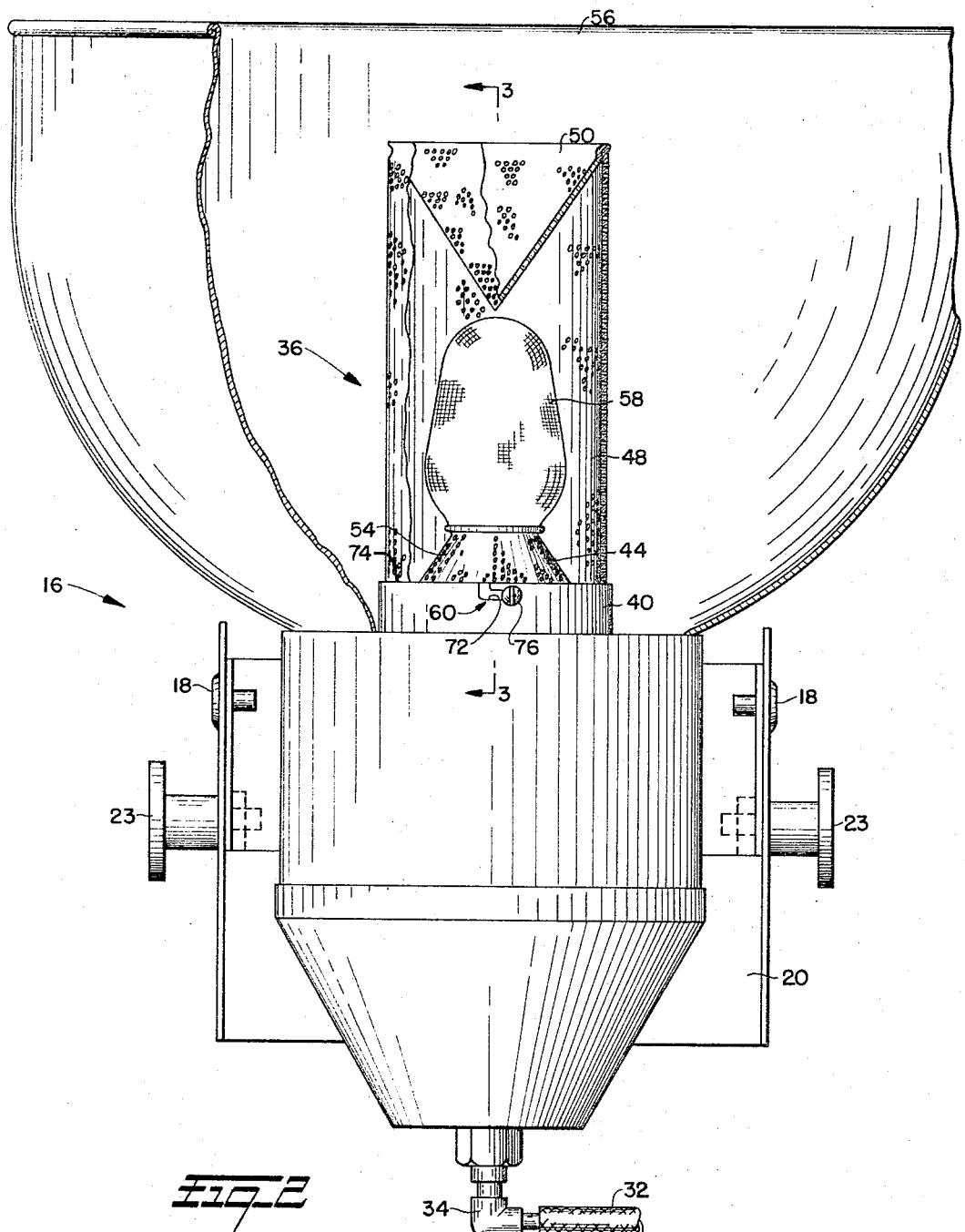

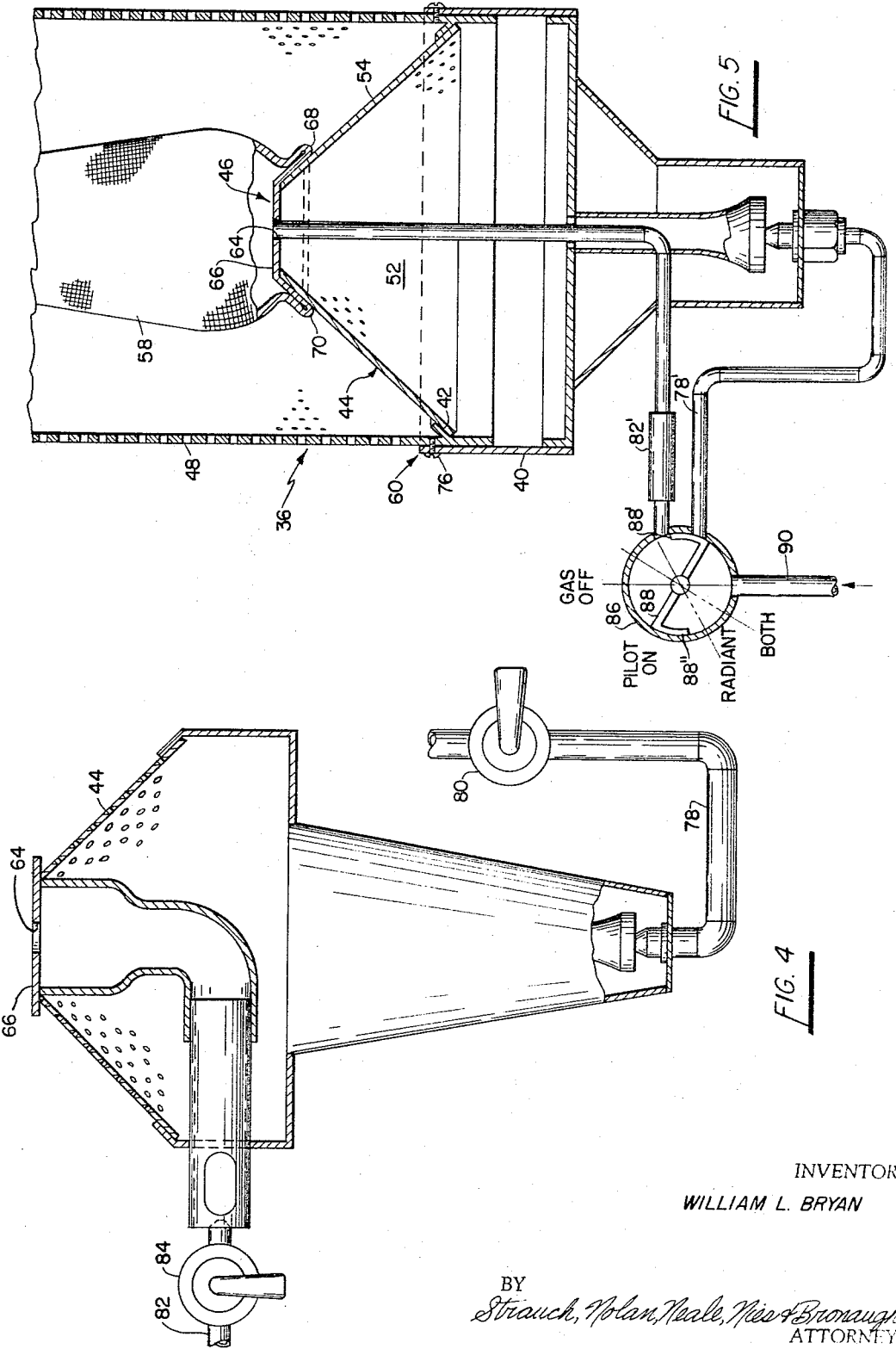

United States Patent Office 3,364,914
Patented Jan. 23, 1968

3,364,914
HEATING AND LIGHTING APPARATUS
William L. Bryan, Cleveland, Ohio, assignor to Hupp Corporation, Cleveland, Ohio, a corporation of Virginia
Continuation-in-part of application Ser. No. 420,365, Dec. 22, 1964. This application Apr. 15, 1966, Ser. No. 549,109
16 Claims. (Cl. 126—92)

This application is a continuation-in-part of my copending application Ser. No. 420,365, filed Dec. 22, 1964, entitled, "Apparatus," which is now abandoned. The invention disclosed relates to infrared generators and, more specifically, to gas-fired [1] infrared units capable of generating heat and light energy combined or, alternatively, light energy only.

Copending application No. 306,658, filed Sept. 3, 1963, by K. E. Bauer for Gas-Fired Infrared Burners and Heaters (hereinafter the "Bauer" application) discloses novel gas-fired infrared heaters in which the stability of the combustion process is not adversely affected by drafts or windy conditions. Such infrared heaters are, therefore, particularly well suited for heating patios and other peopled outdoor areas.

It has now been surprisingly found that these infrared generators can be modified so that they will emit an intense beam of radiant energy in the visible light range (0.4 to $0.7\mu$) as well as radiant energy in the infrared portion of the spectrum most effective for area heating. This is an important discovery as such radiant units can now be utilized to both heat and illuminate outdoor areas, completely eliminating the need for a separate lighting system.

It is the primary object of the present invention to provide infrared generators capable of emitting radiant energy in both the infrared and visible light portions of the electromagnetic spectrum.

Another important, related, and more specific object of the present invention is the provision of infrared generators of the general type disclosed in the Bauer application which are capable of furnishing both heat and light.

A still further object of this invention is to provide infrared generator units capable of producing heat and light with suitable control means, whereby said units may be used selectively either as a heat and light source combined, or as a light source only.

A still further object of this invention is to provide combined infrared heat and light generating units in which variable levels of light generation may be attained by selective modes of operation of the units.

The preferred embodiment of the present invention, by which these goals are attained, consists basically of an infrared heater of the type disclosed in the Bauer application, which is characterized by a novel infrared generator including a frustoconical radiant member of perforated sheet metal with an imperforate cap or baffle which may be heated to incandescence by a combustible fuel mixture which flows from the interior of the radiant member through the perforations and burns on its outer surface. To increase the emitted energy to fuel consumption ratio and to protect the burning gases from disturbance by air currents, the Bauer infrared generators employ a novel sheet metal reradiating assembly consisting of a cylindrical reradiator, one end of which surrounds the radiant member and the other end of which surrounds and supports a conical reradiator which is axially aligned with but spaced from the radiant member. A suitable reflector concentrates the emitted energy into a beam and projects it in the desired direction.

In the present invention, a conventional sleeve type gas mantle is fixed to the frustoconical radiant member with the end of the radiant member extending into the mantle; and an apertured cap is substituted for the imperforate baffle to effect a flow of the combustible mixture from the interior of the radiant into the mantle. Energy made available by the burning of the combustible mixture within the mantle, together with part of the energy liberated from the combustible mixture burning on the outer surface of the radiant member, heats the mantle to a temperature at which it emits an intense white light.

Also, in the present invention, the reradiator assembly is detachably fixed to the radiant instead of being welded to it as in the Bauer application; and a mantle retaining flange or the equivalent is formed on the baffle fixed to the radiant member. These innovations permit the reradiating assembly to be quickly removed for replacement of the mantle when necessary and permit the mantle to be easily fixed in its proper position on the radiant. However, as the mantle is surrounded and protected from drafts and contact by foreign objects, it will have a long useful life in contrast to prior applications of such mantles where they are exposed and short-lived because of their fragility.

From the foregoing brief description of a preferred embodiment of the present invention, it will be apparent that further specific objects of the present invention include the provision of novel infrared generators capable of producing both heat and visible light which:

(1) Are suitable for outdoor operation even under extremely drafty or windy conditions;

(2) Employ conventional gas mantles to convert heat into visible light;

(3) In conjunction with the preceding object, protect the mantle from damage by wind or contact with foreign objects;

(4) In conjunction with object (2) above, provide for ready replacement of the mantle; and (5) In conjunction with object (2) above, do not require specially constructed mantles or mantles of special materials, but can use standard off-the-shelf mantles;

(6) Are arranged for selective operation of the infrared generator with either concurrent emission of heat and light, or the emission of light only.

Further objects of the present invention are the provision of infrared generators in accord with the foregoing objects which are compact, simple, attractive, trouble free, easy to use and service and have:

(1) A high heating capacity size ratio;
(2) A low manufacturing cost per unit of capacity;
(3) A high radiant efficiency;
(4) Rapid attainment of operating temperatures;
(5) High resistance to warping and other adverse temperature change induced deterioration; and
(6) Easy replacement of the radiant element.

Additional objects, other advantages, and further novel features of the present invention will become more fully apparent by reference to the appended claims and as the following detailed description of preferred embodiments proceeds with reference to the accompanying drawing, wherein:

FIGURE 1 is a side elevation of a post-mounted heating unit constructed in accordance with the present invention to supply both radiant heat and visible light;

FIGURE 2 is a plan view of the heating unit with certain parts broken away to show its internal construction;

FIGURE 3 is a section through the radiant heat and visible light generator employed in the heating unit of ---
[1] The term "gas" as used in the present application includes, in addition to fuel gases per se, combustible gases stored under pressure as liquids and liquids which can be vaporized for combustion in gaseous form.

FIGURE 1, taken substantially along line 3—3 of FIGURE 2;

FIGURE 4 is a partial schematic showing of another heat and light generator in accord with the principles of the present invention having independent gas line supplies to the radiant area and to the pilot-mantle portion, with separate valves in each; and FIGURE 5 is a partly sectional and partly schematic view of a further form of heat and light generator having independent gas line supplies to the radiant area and to the pilot-mantle area with a common multiposition valve for controlling gas flow in various combinations.

Referring now to the drawing, FIGURE 1 shows a radiant heating and illuminating unit 16 constructed in accord with the principles of the present invention supported by trunnions 18 from a swivel bracket 20 located on top of a tubular post 22 and provided with knurled knobs 23 to retain it in the position to which it is adjusted. Gas is supplied to heating and illuminating unit 16 through a supply pipe 24 located inside hollow post 22 and extending to a valve 26 located in a post-mounted control casing 28. From the valve, the gas passes through a pipe 30, a flexible conduit 32, and an elbow 34 to heating and illuminating unit 16 where it is mixed with air to form a combustible mixture. Specific structure positioned in the aft portion of unit 16 for providing entry for, entraining and mixing air with the gas is disclosed in the Bauer application and does not form a part of this invention.

Turning next to FIGURE 2, the combustible mixture of gas and air thus formed flows into the interior of a radiant unit 36 coupled to a radiant unit support plate by a quick-disconnect fastening arrangement (the last two components, which are not shown, are described in detail in the Bauer application) and comprised of a base ring 38, a sleeve 40, a radiant support ring 42, a radiant 44, a baffle 46, a reradiator sleeve 48, and a conical reradiator cover 50, all made of stainless steel, Inconel, or other heat resistant metal. The enclosure bounded by base ring 38, sleeve 40, ring 42, radiant 44, and baffle 46 forms a distribution chamber 52 for the gas-air mixture.

The gas-air mixture passes from distribution chamber 52 through the perforations in radiant 44 and burns adjacent the surface of the radiant remote from chamber 52 in a combustion zone 54. Baffle 46 and the conical shape of the radiant 44 contribute to the production of a stable uniform flame and to uniform distribution of heat to the reradiating components 48 and 50.

The principle function of the reradiator is to provide a large surface at a uniform high temperature, resulting in the conversion of a large percentage of the heat of combustion to radiant energy, primarily in the 1–12µ range of wave lengths. In operation, the entire surface of the reradiator is heated to incandescence and may reach a temperature several hundred degrees above that of the radiant.

Radiant heating and illuminating unit 16 also includes a reflector 56 which, as shown in FIGURE 2, may be a bell-shaped member having an internal reflecting surface approximating the shape of a paraboloid. The axis of symmetry of the reflector lies on the axis of symmetry of radiant 44. The reflector is preferably formed of suitable aluminum alloy and may have either a matte or a polished interior surface.

The flow of gas to heating and illuminating unit 16 is controlled by manipulation of the valve 26 in control casing 28. The manual valve 26 shown in FIGURE 1 may be replaced by any other suitable control unit; and the burner may be ignited manually or electrically by a spark from a high voltage circuit including the secondary winding of a transformer which may be housed in control casing 28.

The components of the radiant heating and illuminating unit 16 just described are, with the exceptions discussed below, identical to those employed in the Bauer radiant heater and are discussed in more detail in the Bauer application, to which reference may be had if desired. As such details are not part of the present invention, it is not believed necessary to include them herein.

Referring now to FIGURE 3, the radiant heating and illuminating unit 16 of the present invention differs from the radiant heater disclosed in the Bauer application primarily by the addition of a sleeve type gas mantle 58 to radiant unit 36 to produce visible light (radiant energy primarily in the 0.4 to 0.7µ range of wave lengths) from the burning gases and the radiation emitting components of the radiant unit. Radiant heating and illuminating unit 16 also differs from the radiant heating unit of the Bauer application by the employment of a different construction of the baffle 46 at the end of radiant 44, by the lengthening of reradiator 48 to accommodate mantle 58, and by fastening means identified by reference character 60 which permit the reradiator to be quickly removed for access to mantle 58 when it is necessary to replace the latter.

As shown in FIGURE 3, baffle 46 is of frustoconical configuration and has a laterally extending annular flange 62 around its lower edge and an aperture 64 through its top wall 66. Baffle 46 is permanently fixed to radiant 44 as by spot welding.

Gas mantle 58 is a standard mantle of the sleeve type with a drawstring 68 at its open end. Suitable mantles are available from Lighting Trades & Welsbach, Limited of London, England, although any other commercially available brand of mantle may be used, it being one of the important features of the present invention that neither a special configuration of mantle nor a mantle made of special materials is required.

Mantle 58 is attached to baffle 46 with its open end 70 facing radiant 44 and with the mantle extending from the radiant toward conical reradiator 50 by sliding the mantle down over flange 62 until drawstring 68 passes the flange and then tightening the drawstring.

Depending upon the particular type of mantle employed, other arrangements may be employed to assemble it in the radiant unit; and the configuration of baffle 46 may be varied to accommodate different types of mantles and mantles with different types of attaching arrangements. Also, the flange 62 around the lower edge of baffle 46 need not be continuous but may consist of a series of equiangularly spaced lips or projections.

In the operation of unit 16, a portion of the combustible air-gas mixture flows from distribution chamber 52 through aperture 64 into the interior of mantle 58 where it burns and heats the mantle. Additional energy is made available by the combustion between 44 and 48, and a portion of this is transferred to the mantle.

The mantle is thereby heated to a temperature at which it emits white light consisting primarily of radiant energy having a wave length in the range of 0.4 to 0.7 micron. The white light radiates through the apertures in radiators 48 and 50 and is concentrated and projected in the desired direction by reflector 56 in the form of a beam of intense white light.

An undesirable characteristic of gas lamps and lanterns heretofore known and employing gas mantles in that such mantles are extremely fragile and are destroyed by contact with foreign objects or even by strong drafts or wind.

In the present invention, however, this is not a problem because mantle 58 is protected from strong winds and from contact with foreign objects by reradiator sleeve 48 and the conical reradiator cover 50 which also protect the combustion in zone 54 from disturbance by wind or strong drafts.

As mentioned briefly above, fastening means 60 are provided to permit ready removal of reradiators 48 and 50 for replacement of mantle 58. Any desired type of fastening means which will accomplish this may be employed. The arrangement shown at 60 in the illustrated embodiment of the present invention consists simply of L-shaped or bayonet slots 72 opening onto the upper edge 74 of sleeve 40 and screws 76 threaded into the lower end of reradiator 48. Reradiators 48 and 50 are installed by aligning screws 76 with the vertical legs of slots 72, moving the reradiators toward sleeve 40 until screws 76 bottom in slots 72, and then rotating the reradiators in a counterclockwise direction (as shown in FIGURE 2) until screws 76 reach the ends of the slots' horizontal legs. Screws 76 may then be tightened, if desired, to retain the reradiators in place. Removal of reradiators 48 and 50 is accomplished by loosening screws 76 (if they have been previously tightened) and then removing these components by reversing the sequence of steps just described.

Radiant unit 36 can be quickly and easily removed to provide access to screws 76; or the screws can be readily rotated with the radiant unit installed by using a right-angle screwdriver.

It is further contemplated that provision may be made for operation of the unit in such manner that only radiant energy in the visible spectrum is generated, i.e., effective infrared heat is not generated. For example, an alternate fuel-air supply tube could be provided for dispensing a fuel mixture in limited amounts into the mantle for combustion therein to provide illumination in a manner well known in the art, without developing substantial quantities of heat. Such alternate operation, if maintained continuously, may serve as a pilot for the infrared generator.

Structures designed to permit alternative operations are shown schematically in the modifications of FIGURES 4 and 5. FIGURE 4 illustrates an arrangement in which gas to radiant 44 is supplied by line 78 containing a valve 80, while gas to the pilot and mantle is supplied by a separate line 82 incorporating valve 84. It will be obvious that this provides for independent, selective control of the infrared generator with attendant heat and light generation or for light generation by mantle 58 only.

FIGURE 5 illustrates a further modification wherein two separate gas lines 82' and 78' lead to the pilot-mantle assembly and to radiant 44, respectively, but wherein the gas flow is controlled by a single multi-position valve 86. As illustrated, the valve gate element 88 has two opposed blades 88' and 88''; the first of these cooperates with ports opening to lines 78' and 82' while the second blade 88'' cooperates with a third port leading to gas inlet line 90.

With the gate valve in the position shown in FIGURE 5, gas is admitted into the body of the valve and is free to flow, through line 82', to the pilot and the mantle light generator. In the next position counterclockwise, blade 88' shuts off flow to line 82' and opens line 78' to radiant 44; in the following (third) counterclockwise position both lines 82' and 78' are open, and gas flows to both the mantle 58 and radiant 44. Finally, in the fourth counterclockwise position, blade 88'' closes off the port at the gas inlet line 90, thereby shutting off the entire unit.

It will be understood that, in the first valve position (shown in FIG. 5), combustible gas-air mixture may be burned within the mantle for illumination only; in the next, counterclockwise position, combustion will take place at the radiant for combined heating and lighting effects; in the third, counterclockwise valve position, combustion will take place at the radiant and the mantle with augmented heating and lighting effects; in the fourth position, the unit will be shut off.

The relative spacing of the outlet ports to lines 78' and 82' and the length of the blade 88' are such that, as the blade moves counterclockwise, the port at 78' begins to open before the port at 82' is fully closed. In this way, the pilot, if burning, tends to remain on long enough to ignite the gas-air mixture to radiant 44 before it is fully shut off by blade 88'.

The foregoing is but a representative arrangement of ports and blades, and other suitable sequencing of port closure may be provided within the scope of this disclosure.

The foregoing valve constructions of FIGURES 4 and 5 may be placed either in series with valve 26 of FIGURE 1, or may displace the latter. The separate valves 80 and 84 of FIGURE 4, or the combined valve 86 of FIGURE 5, can be readily incorporated within the swiveled housing of the unit with the control knobs protruding externally therefrom for ready manipulation. Alternatively, the selectively operable valves may be mounted on post 22 in place of valve 26 (FIGURE 1).

Three different levels of illumination are possible through selective setting of the control valves described above. The level of illumination is the highest when gas is burned at the radiant as well as within the mantle, lower when it is burned in the mantle only, and still lower when burned at the radiant only.

From the foregoing detailed description of the preferred embodiment of the present invention, its advantages over the heating units disclosed in the Bauer application will be apparent. Further advantages of the present invention, which result from employing the same general type of basic unit as disclosed in the Bauer application, are a high heating capacity—size ratio, low manufacturing cost per unit of heating capacity, high radiant efficiency, rapid obtainment of operating temperatures, high resistance to warping and other adverse temperature change induced deterioration, and ease of replacement of component parts such as the radiant unit 36.

Another advantage obtained by use of the novel combination disclosed herein is an output of light having a greater intensity than heretofore developed in the accustomed use of mantles; the increased luminescence is explained in part by the subjection of the mantle to combustion and hot combustion products on both the inner and outer faces thereof.

Therefore, because of these added advantages, it is preferred that the radiant heating and illuminating units of the present invention employ radiant heating units of the type disclosed in the Bauer application. This is not necessary, however, and other types of radiant heaters can be provided with mantles, in accord with the principles of the present invention, to produce a combination of infrared heat and visible light. Exemplary of known radiant heaters which can be thus modified in accord with the principles of the present invention are those employing ceramic radiants such as the well known Schwank radiant heaters disclosed in U.S. Patent No. 2,775,294 issued Dec. 25, 1956 to Gunter Schwank for Radiation Burners. The modification of Schwank and other radiant heaters in accord with the principles of the present invention, therefore, is fully intended to be covered by the appended claims except as expressly excluded therefrom.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A heating and lighting unit including means for generating radiant heat and visible light comprising: an apertured radiant member; means for forcing a combustible mixture of gas and air through the apertures in said member to a combustion zone immediately adjacent the exterior surface of said member; an apertured reradiating member surrounding said radiant member beyond the combustion zone; and a gas mantle disposed in said reradiating member and fixed to said radiant member, said radiant member having at least one aperture providing fluid communication between the interior of said member and the interior of the mantle.

2. The heating and lighting unit as defined in claim 1, including a reflector surrounding said reradiator member.

3. The heating and lighting unit as defined in claim 1, wherein the reradiating member is cylindrical and has one end near an end of the radiant member, said unit further including a reradiating cover member near the other end of the reradiating member.

4. The heating and lighting unit as defined in claim 3, wherein the reradiating cover member is an apertured cone with the apex of the cone inside the reradiating member.

5. The heating and lighting unit as defined in claim 1, wherein the radiant member is a truncated cone with the small end thereof extending into the mantle.

6. The heating and lighting unit of claim 1, together with support means for said heat and light generating means; swivel means mounting said generating means on said support and permitting rotational movement of the generator relative to the support in two mutually perpendicular planes; and a flexible gas supply line fixed at opposite ends to the generating means and the support.

7. A radiant unit for a heating and illumination unit, comprising: an elongated cylindrical reradiator; a frustoconical radiant concentric with said reradiator, the upper base of said radiant being within the reradiator, and a gas mantle fixed relative to said radiant and extending therefrom toward the opposite end of the reradiator, the interiors of the radiant and mantle being in fluid communication.

8. The radiant unit defined in claim 7, together with means removably fixing the reradiator relative to the radiant.

9. The radiant unit as defined in claim 7, together with a radiant support ring surrounding the radiant and the end of the reradiator into which the radiant extends, the radiant being fixed to the support ring; and means for removably fastening the reradiator to the support ring.

10. The radiant unit as defined in claim 9, wherein the fastening means includes slots in the support ring and screws extending through said slots into threaded engagement with the reradiator.

11. The radiant grid unit as defined in claim 7, together with a frustoconical baffle over the end of the radiant within the reradiator between the radiant and the mantle, said baffle having an aperture in its upper base providing fluid communication between the interiors of the mantle and the radiant and a mantle retaining flange around its free edge.

12. The radiant unit as defined in claim 7, together with a conical reradiator cover fixed to and surrounded by the reradiator at said opposite end thereof, the apex of the reradiator cover being within the reradiator and spaced from the end of the mantle nearest said opposite reradiator end.

13. A heating and lighting unit of the gas-fired, radiant energy generating type, comprising: a radiant member adapted to be heated to infrared radiation emitting temperatures by the combustion of a portion of a gaseous fuel-air mixture; a mantle for receiving a second portion of the fuel-air mixture to produce radiation in the visible light portion of the electromagnetic spectrum; and means for directing the fuel-air mixture to a first combustion zone in proximity to said radiant member to produce said infrared radiation and thereafter said visible radiation and to a second combustion zone inside the mantle to also produce visible radiation therefrom.

14. A heating and lighting unit comprising a radiant unit as defined in claim 13, together with means for concentrating the infrared radiation and the radiation in the visible light portion of the spectrum into a beam of desired configuration and projecting it in a selectively variable direction.

15. A heating and lighting unit as defined in claim 13, together with selective controls for controlling the amount of fuel-air mixture supplied to the mantle.

16. A heating and lighting unit of the gas-fired, radiant energy generating types, comprising: a radiant adapted to be heated to infrared radiation emitting temperatures by the combustion of a gaseous fuel-air mixture; a mantle for converting a portion of the energy made available by the combustion of the fuel-air mixture to radiation in the visible light portion of the electromagnetic spectrum; means for supplying the fuel-air mixture to the mantle for combustion therein; and manipulative valve means for selectively controlling the flow of said mixture to the radiant and to the interior of the mantle.

References Cited

UNITED STATES PATENTS

| | | | |
|---|---|---|---|
| 738,968 | 9/1903 | Wister | 67—101 |
| 1,506,964 | 9/1924 | Antrim | 126—92 |
| 1,852,154 | 4/1932 | Drake et al. | 126—92 |
| 1,981,976 | 11/1934 | Wem | 126—92 |
| 2,985,137 | 5/1961 | Horne | 126—92 |
| 3,217,701 | 11/1965 | Weiss | 126—92 |
| 3,245,458 | 4/1966 | Patrick | 126—92 |

FOREIGN PATENTS 4240 of 1884      Great Britain.

JAMES W. WESTHAVER, *Primary Examiner.*